United States Patent [19]
Kidorf

[11] Patent Number: 6,028,684
[45] Date of Patent: Feb. 22, 2000

[54] PATH TO PROVIDE OTDR MEASUREMENTS OF AN OPTICAL TRANSMISSION SYSTEM THAT INCLUDES OPTICAL ISOLATORS

[75] Inventor: Howard D. Kidorf, Red Bank, N.J.

[73] Assignee: Tyco Submarine Systems Ltd, Morristown, N.J.

[21] Appl. No.: 08/740,042

[22] Filed: Oct. 23, 1996

[51] Int. Cl.[7] .................................................. H04B 10/08
[52] U.S. Cl. ........................ 359/110; 359/152; 359/173; 356/73.1
[58] Field of Search ................................... 359/110, 152, 359/173, 174, 176, 177, 179, 143, 113; 385/24; 356/73.1

[56] References Cited

U.S. PATENT DOCUMENTS

| | | | |
|---|---|---|---|
| 4,794,249 | 12/1988 | Beckmann et al. | 350/277 |
| 5,214,728 | 5/1993 | Shigematsu | 305/24 |
| 5,321,541 | 6/1994 | Cohen | 359/127 |
| 5,343,286 | 8/1994 | Keeble et al. | 356/73.1 |

*Primary Examiner*—Kinfe-Michael Negash
*Attorney, Agent, or Firm*—Brian K. Dinicola

[57] ABSTRACT

A path couples a pair of optical fibers in an optical transmission system. The transmission system includes a plurality of optical amplifiers placed along the transmission line. Associated with these optical amplifiers are optical isolators that limit the flow of optical energy to a single direction. The path allows reflected or scattered light from one optical fiber after the optical isolator to be returned via the other optical fiber. This enables an OTDR device to obtain measurement information along the entire length of the fibers between optical isolators.

14 Claims, 3 Drawing Sheets

# PATH TO PROVIDE OTDR MEASUREMENTS OF AN OPTICAL TRANSMISSION SYSTEM THAT INCLUDES OPTICAL ISOLATORS

BACKGROUND OF THE INVENTION

The present invention is directed to a path between a pair of fibers in an optical fiber transmission system. More particularly, the present invention is directed to a path that allows Optical Time-Domain Reflectometry ("OTDR") measurements of an optical fiber transmission system that includes repeaters and optical isolators.

An OTDR is a fiber-optic measurement instrument. An OTDR operates by sending a probe signal down a fiber and monitoring the small fraction of the light scattered or reflected back to it. The reflected light can be used to determine if there is a fault in the fiber.

A typical long range optical transmission system includes a pair of unidirectional optical fibers. An optical signal attenuates over long distances. Therefore, the optical fibers typically include multiple repeaters spaced apart. The repeaters include optical amplifiers that amplify incoming attenuated optical signals. The repeaters also include an optical isolator that limits the propagation of the optical signal to a single direction.

A typical long range optical transmission system requires a technique for determining the location of faults along the transmission path using only equipment located at the ends of the transmission system. Two techniques are in common use: loopback and OTDR.

The loopback technique operates by placing a coupling in the repeater so that a portion of the signal from one direction is coupled into the opposite direction. The return signal is then analyzed by equipment at the end of the transmission system to detect the magnitude of the returns from each of the repeaters.

It is known that modifications to a transmission system are required to permit the OTDR technique. This is due to the unidirectional behavior of the optical isolator that eliminates the scattered and reflected light in the return direction. To make use of the OTDR, the paired transmission line is used to carry the returned light. A coupling is provided in each repeater to accomplish this.

FIG. 1 illustrates a known arrangement that is used to implement the coupling required by both the loopback and OTDR techniques. The segment of an optical transmission system in FIG. 1 includes fibers 10, 12 on which the optical signals travel in the direction indicated by the arrows. Multiple repeaters are disposed along the fibers 10, 12. Two such repeaters 14, 16 are shown in FIG. 1. Repeaters are typically spaced 30 to 120 km apart.

Repeater 14, which is typical of all of the repeaters along the fibers 10, 12, is shown in detail in FIG. 1. Repeater 14 includes optical amplifiers 17, 18 which amplify the optical signal along the transmission line. Typical optical amplifiers are constructed with an erbium doped fiber that is pumped by a laser source. Optical isolators 21, 25 are required in long transmission spans to eliminate backwards propagating light and to eliminate multiple path interference.

The coupler arrangement shown inside repeater 14 provides the path required for both fault location techniques. These paths are implemented with couplers 30, 40, 50 and 60. This coupler arrangement provides loopback and OTDR paths for both optical fibers 10 and 12.

Transmission on optical fiber 10 can be used as an example. The signal follows the loopback path through couplers 30, 50 and 60 on the following fibers: 31-34-53-51-63-62. The looped back signal then travels along with the data on transmission path 12. Typically the looped back signal is attenuated by about 45 dB relative to the signal present on fiber 31.

The coupler arrangement also implements a path for use by the OTDR. Signals generated by reflection or scattering between repeaters 14 and 16 enter coupler 30 on fiber 32. The signal follows the following fibers: 32-33-41-42-52-51-63-62. The signal then travels along with the data on transmission path 12. Typically the OTDR signal is attenuated by about 20 dB relative the signal present on fiber 32.

Similar paths are taken by signals traveling on optical fiber 12.

Amplification schemes other than that shown in FIG. 1 have recently been developed. These systems use remote amplifiers that do not require electrical power. An example of such a system is illustrated in FIG. 2 in which amplifiers 76, 79, 83, 86 are disposed on the transmission paths 90, 91 between two repeaters 70, 72. The power for the amplifiers 76, 79, 83, 86 is delivered optically either through the use of dedicated pump fibers 75, 80 or through a portion of the transmission paths 91, 90. Isolators 66, 77, 78, 68, 69, 81, 82, 67 are required to eliminate backwards propagating light and to eliminate multiple path interference. Unfortunately, these isolators eliminate the reflections caused in transmission fibers 58, 84, 91, 59, 85, 90. This makes the OTDR technique for fault location impossible. Further it is undesirable to place an entire coupler arrangement, including couplers 30, 40, 50, 60 shown in FIG. 1 at the location of the remote amplifiers because using a mechanical housing of sufficient size to accommodate all four couplers is expensive and undesirable.

SUMMARY OF THE INVENTION

The present invention is a path that couples a pair of optical fibers in an optical transmission system. The transmission system includes a plurality of optical amplifiers placed along the transmission line. Associated with these optical amplifiers are optical isolators that limit the flow of optical energy to a single direction.

The path allows reflected or scattered light from one optical fiber after the optical isolator to be returned via the other optical fiber. This enables an OTDR device to obtain measurement information along the entire length of the fibers between optical isolators.

DETAILED DESCRIPTION

Figure 1:
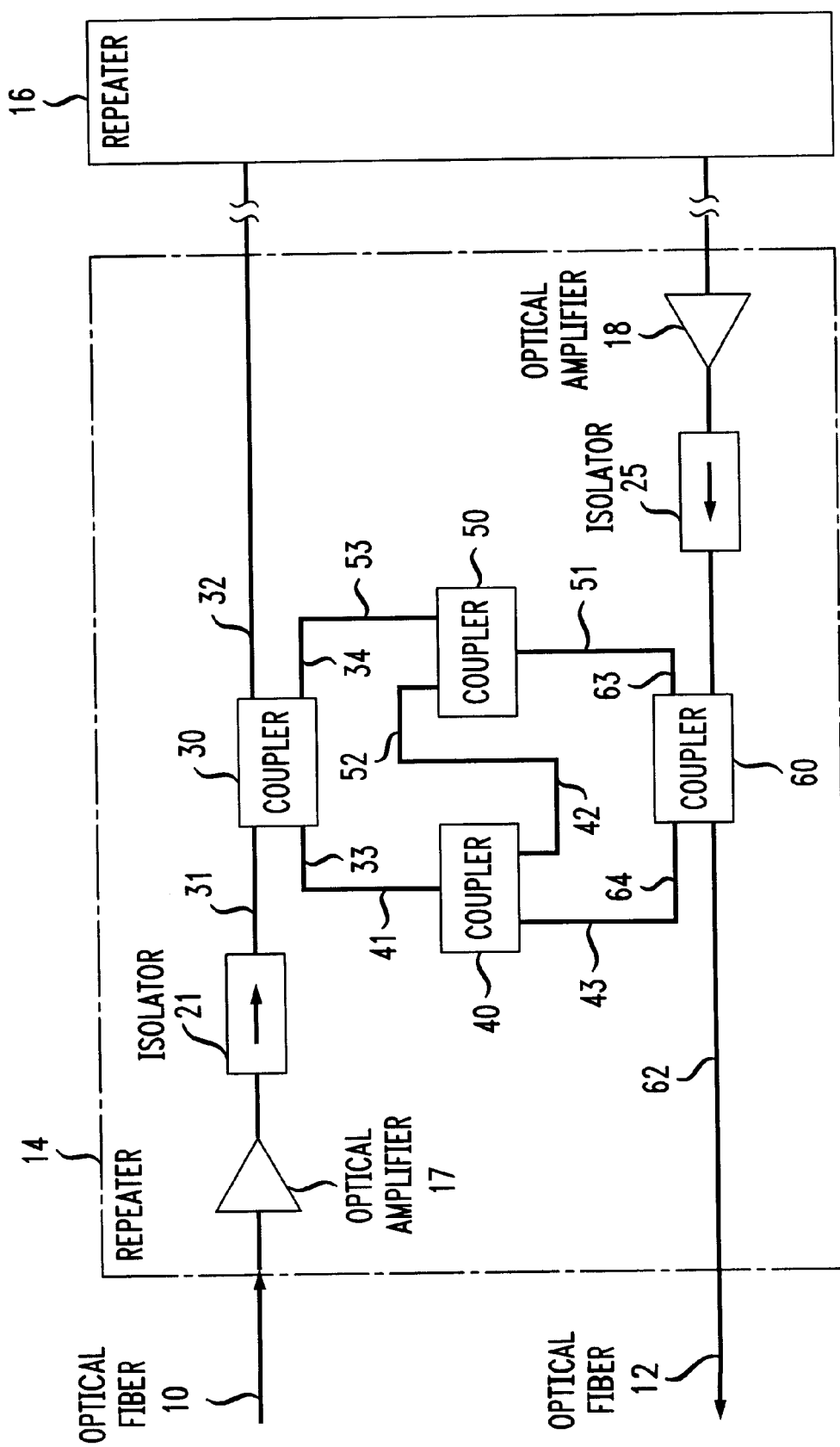
FIG. 1 illustrates a segment of a repeatered optical transmission system that can be used with an OTDR.

The invention will be described in connection with an exemplary optical transmission system that includes repeaters, remote amplifiers and optical isolators. The invention is a path within such a transmission system that allows OTDR measurements along the entire length of the optical fibers between the optical isolators. The invention may also be applied to transmission systems that do not make use of remote amplifiers such as that shown in FIG. 1.

Figure 3:
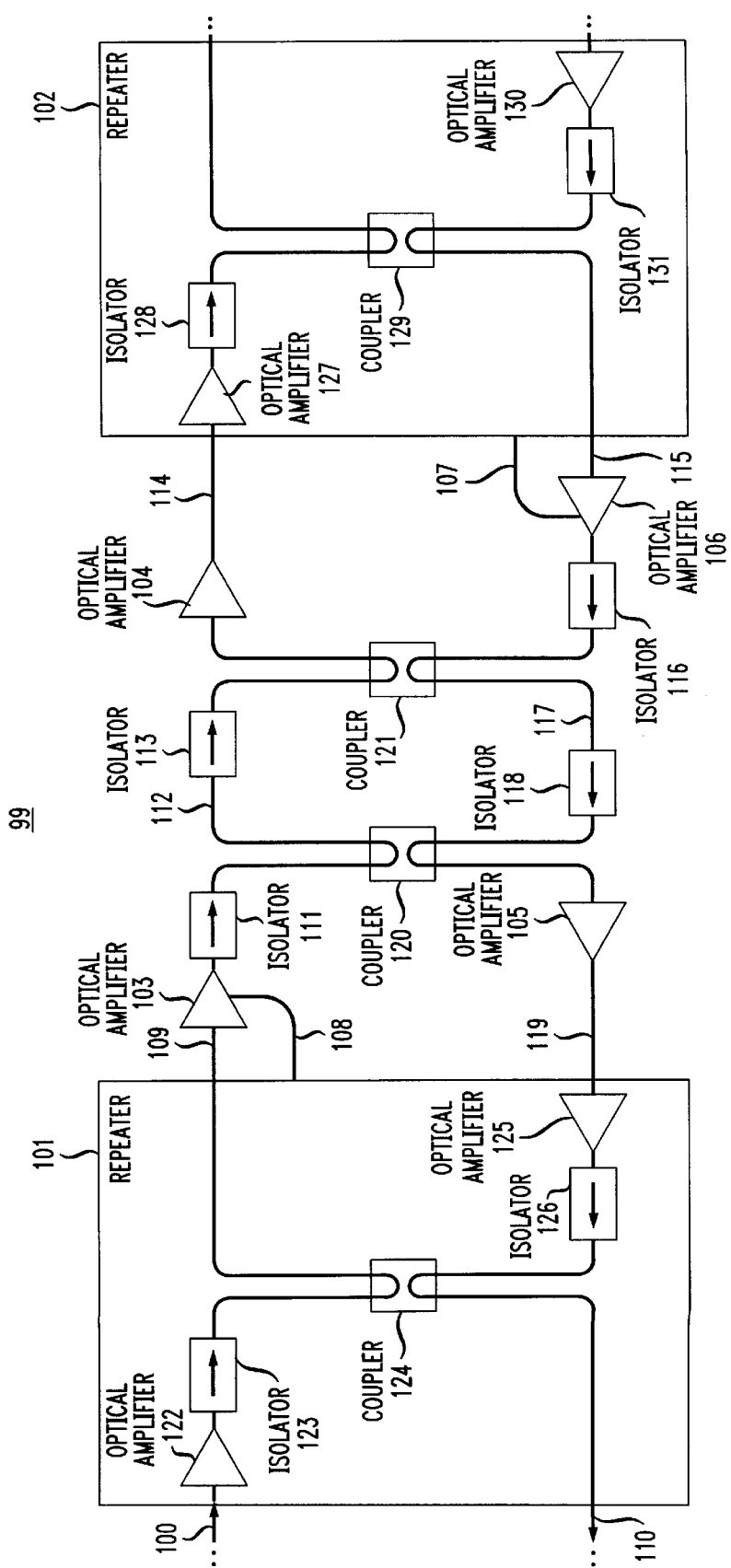
FIG. 3 illustrates a segment of a repeatered optical transmission system that includes remote amplifiers and the present invention.

FIG. 3 illustrates a segment of an optical transmission system that includes repeaters, remote amplifiers and the present invention. The optical transmission system 99 includes a pair of optical fibers 100, 110 on which optical signals travel in the direction indicated by the arrows. Multiple repeaters are placed along the fibers 100, 110. Two such repeaters 101, 102 are shown in FIG. 3.

Figure 2:
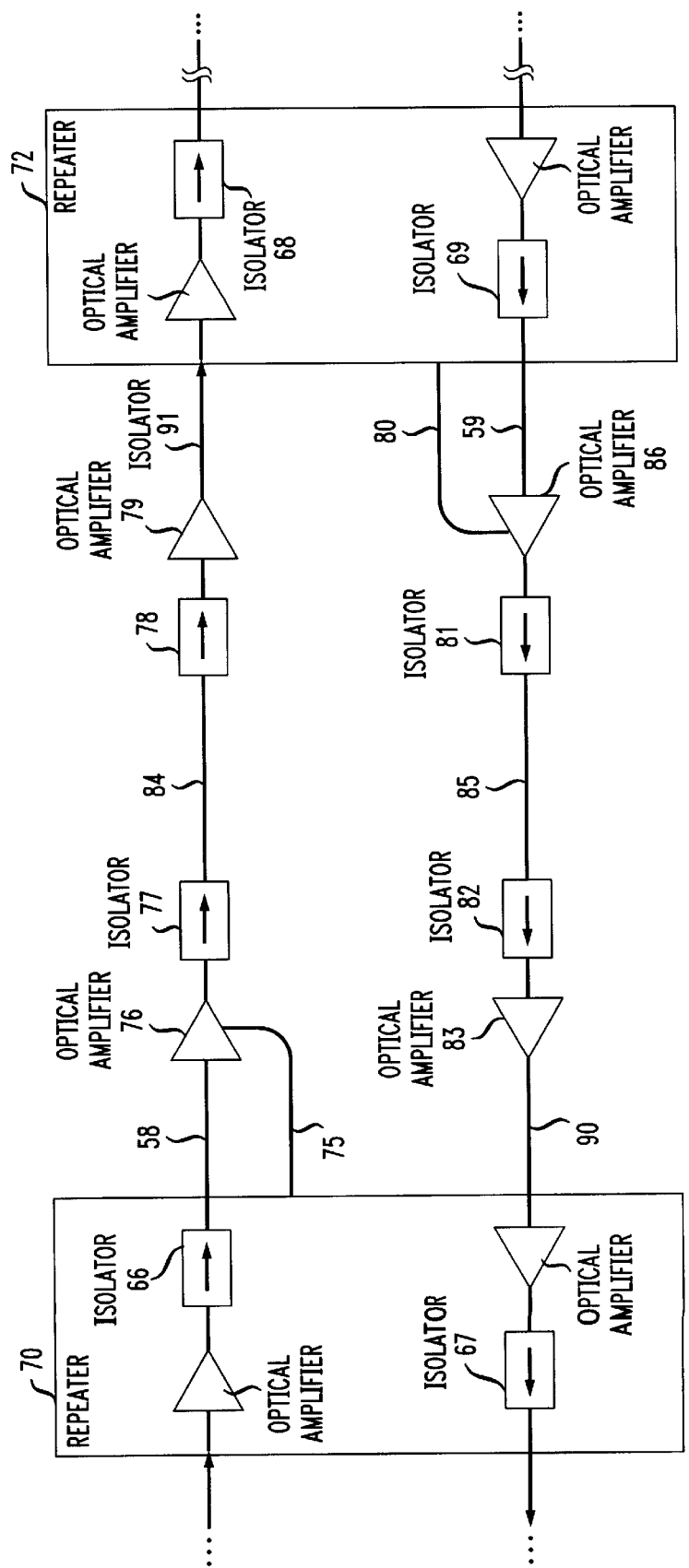
FIG. 2 illustrates a segment of a repeatered optical transmission system that includes remote amplifiers.

The repeater configuration and remote amplifiers are similar to those shown in FIG. 2. The transmission system 99 includes multiple remote amplifiers 103–106 that are external to the repeaters 101, 102. The repeaters 101, 102 include amplifiers 122, 125, 127, 130. The power for amplifiers 103, 106 is delivered optically through dedicated pump fibers 108, 107, respectively. The power for amplifiers 104, 105 is delivered through transmission paths 114, 119, respectively. Isolators 123, 111, 113, 128, 131, 116, 118, 126 are required to eliminate backwards propagating light and to eliminate multiple path interference.

Because of the presence of the optical isolators in transmission system 99, an OTDR-based fault locator would not normally provide measurement information for the optical transmission path past the first optical isolator on the transmission path.

In order to allow OTDR measurements on the transmission system 99, a path must be provided for the reflected and scattered light from transmission fibers 109, 112, 114, 115, 117, 119 to be returned to the source of the OTDR probe signal. The present invention provides this path for the return signal at all locations where it is required by using optical couplers 124, 120, 121, 129.

For example, a probe signal entering the optical transmission system 99 on transmission fiber 100, and reflected from transmission fiber 112, would be returned on transmission fiber 110 via coupler 120. Similarly, a probe signal entering this representative portion of the transmission system on transmission fiber 110, that is reflected from transmission fiber 119, for example, would be returned on transmission fiber 100 via coupler 120.

The present invention can be used with an optical transmission system with remote amplifiers to enable the return of the OTDR signal from the entire length of the transmission path between the repeater regardless of the presence of the optical isolators. The present invention may also be applied to a transmission system that has no remote optical amplifiers by, for example, placing the optical coupler inside of the repeater housing similar to the optical coupler 124 in repeater 101 in FIG. 3.

What has been described is merely illustrative of the application of the principles of the present invention. Other arrangements and methods can be implemented by those skilled in the art without departing from the spirit and scope of the present invention.

What is claimed is:

1. An optical transmission system comprising:
    a first optical fiber, said first optical fiber having an input and an output;
    a second optical fiber, said second optical fiber having an input and an output;
    a third optical fiber, said third optical fiber having an input and an output;
    a fourth optical fiber, said fourth optical fiber having an input and an output;
    a first optical isolator coupled to said output of said first optical fiber, said first optical isolator having an input and an output;
    a second optical isolator coupled to said output of said third optical fiber, said second optical isolator having an input and an output;
    an optical coupler having four ports and coupled to the output of said first optical isolator, the input of said second optical fiber, the output of said second optical isolator, and the input of said fourth optical fiber;
    a first path through said optical coupler coupling the input of said first optical fiber to the input of said second optical fiber;
    a second path through said optical coupler coupling the input of said second optical fiber to the input of said fourth optical fiber;
    a third path through said optical coupler coupling the input of said third optical fiber to the input of said fourth optical fiber; and
    a fourth path through said optical coupler coupling the input of said fourth optical fiber coupler to the input of said second optical fiber.

2. The optical transmission system of claim 1, further comprising:
    a first optical amplifier disposed on said first path; and
    a second optical amplifier disposed on said third path.

3. The optical transmission system of claim 2, wherein said first and second optical amplifiers are remote optical amplifiers.

4. The optical transmission system of claim 2, wherein said first and second optical amplifiers are within a repeater.

5. The system of claim 1, further comprising first and second terminals for transmitting and receiving optical communication signals transmitted in a first direction along a third path that includes said first and second optical fibers and in a second direction along a fourth path that includes said third and fourth optical fibers.

6. The system of claim 5, wherein said first path supports communication along said first direction and said third path supports communication along said second direction.

7. The system of claim 6, wherein said second path supports a returning OTDR signal to said first terminal and said fourth path supports a returning OTDR signal to said second terminal.

8. In an optical fiber communication system establishing bi-directional communication between a local terminal and a remote terminal optically coupled by first and second optically amplified optical communication paths, a system facilitating monitoring of an optically amplified transmission path by optical time domain reflectometry (OTDR) comprising:
    a first plurality of optical isolators disposed at intermediate locations along the first optical communication path, each of the first plurality of optical isolators being operative to propagate light in a first direction and to substantially prevent propagation of light in a second direction opposite to the first direction to thereby direct signals transmitted by the local terminal to the remote terminal;
    a second plurality of optical isolators disposed at intermediate locations along the second optical communication path, each of the second plurality of optical isolators being operative to propagate light in said second direction and to substantially prevent propagation of light in said first direction to thereby direct signals transmitted by the remote terminal to the local terminal; and
    a plurality of optical couplers, each respective optical coupler receiving optical input from a corresponding one of the first plurality of optical isolators and a corresponding one of the second plurality of optical isolators and being operative to couple backwards propagating optical energy received from the first optical communication path to the second optical communication path and to couple backwards propagating optical energy received from the second optical communication path to the first optical communication path, whereby optical energy coupled by each said optical coupler may be analyzed using OTDR to locate faults along at least one of the first and second optical communication paths.

9. The system of claim 8, further including, at each said intermediate location, a respective housing containing one of said plurality of optical couplers, a portion of each of said first and second communication paths, a corresponding one of said first plurality of optical isolators, and a corresponding one of said second plurality of optical isolators.

10. The system of claim 9, wherein at each said intermediate location, each said housing further contains first and second optical amplifiers disposed along said first and second communication paths, respectively.

11. The system of claim 10, wherein within a corresponding housing at at least one of said intermediate locations, the first and second optical amplifiers are remotely pumped from a location external to the corresponding housing.

12. In an optical fiber communication system establishing bi-directional communication between a local terminal and a remote terminal optically coupled by first and second optically amplified optical communication paths, in which each said optical communication path is monitored by optical time domain reflectometry (OTDR), a loopback module comprising:

a housing, a portion of each of said first and second communication paths extending therethrough;

a first optical optical isolator disposed along the first communication path, the first optical isolator being operative to propagate light in a first direction and to substantially prevent propagation of light in a second direction opposite to the first direction to thereby direct signals transmitted by the local terminal to the remote terminal;

a second optical isolator disposed along the second communication path, the second optical isolator being operative to propagate light in said second direction and to substantially prevent propagation of light in the first direction to thereby direct signals transmitted by the remote terminal to the local terminal; and an optical coupler receiving optical input from the first optical isolator and from the second optical isolator and being operative to couple backwards propagating optical energy received from the first optical communication path to the second optical communication path and to couple backwards propagating optical energy received from the second optical communication path to the first optical communication path, whereby optical energy coupled by the optical coupler may be analyzed using OTDR to locate faults along at least one of the first and second optical communication paths.

13. In a bi-directional optical fiber communication system comprising first and second optical communication paths having a respective plurality of optical amplifiers and optical isolators disposed at intermediate locations therealong, the optical isolators in said first communication path being operative to propagate light only in a first direction and the optical isolators in the second path being operative to propagate light only in a second direction opposite to said first direction to thereby collectively establish respective one-way communication links between a local terminal and a remote terminal, a method of locating a fault along at least one of said first and second optical communication paths, comprising the steps of:

supplying an optical probe signal to the first optical communication path for transmission therealong;

directing a reflected portion of the probe signal from the first optical communication path to the second optical communication path via a four port optical coupler; and performing optical time domain reflectometry on the reflected portion of the probe signal.

14. The method of claim 13, wherein said optical probe signal is a first optical probe signal, further including supplying a second optical probe signal to the second optical communication path for transmission therealong;

directing a reflected portion of the second probe signal from the second optical communication path to the first optical communication path via the four port optical coupler; and performing optical time domain reflectometry on the reflected portion of the second probe signal.

* * * * *